Nov. 28, 1933.     H. SINCLAIR     1,937,364
HYDRAULIC COUPLING
Filed Jan. 8, 1931     3 Sheets-Sheet 2
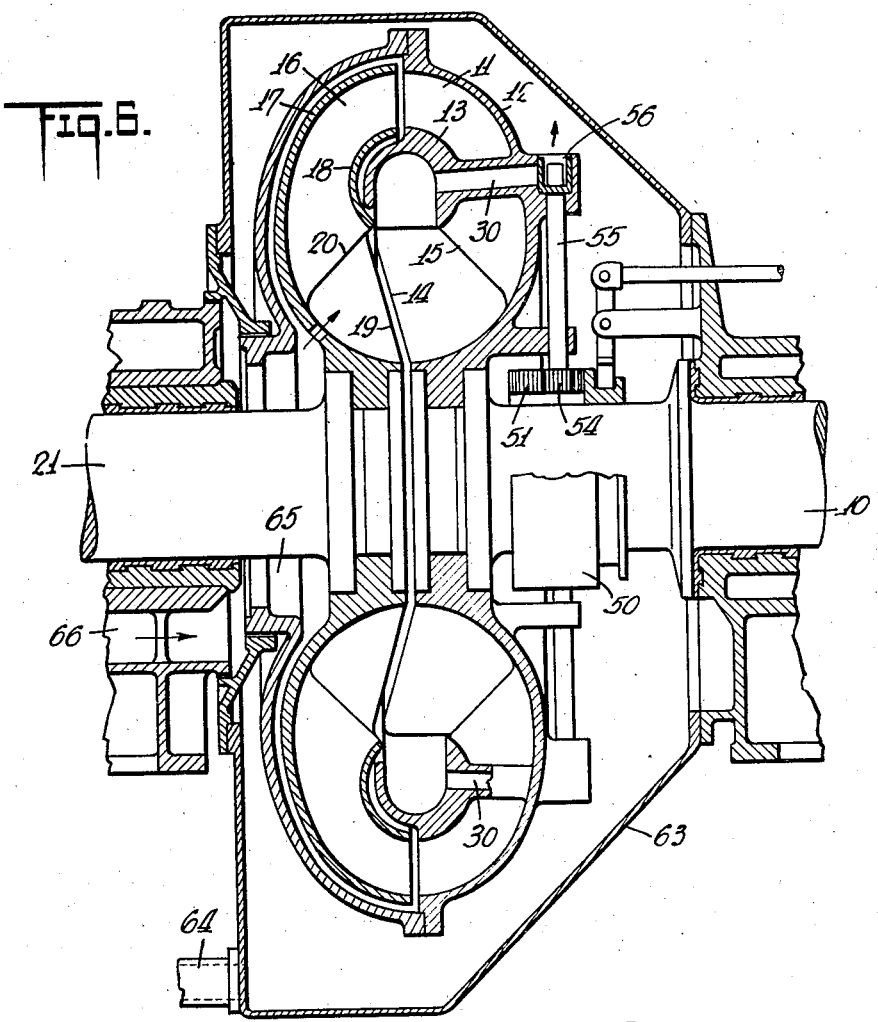
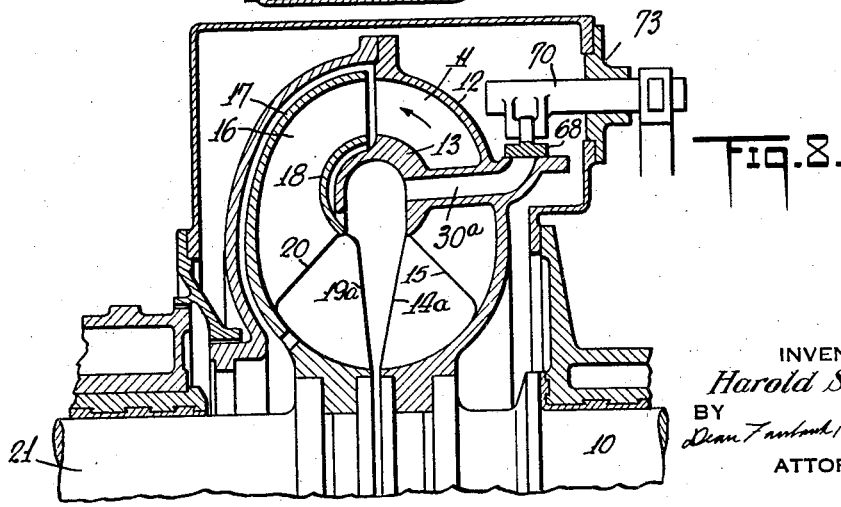
INVENTOR
Harold Sinclair
BY
ATTORNEYS

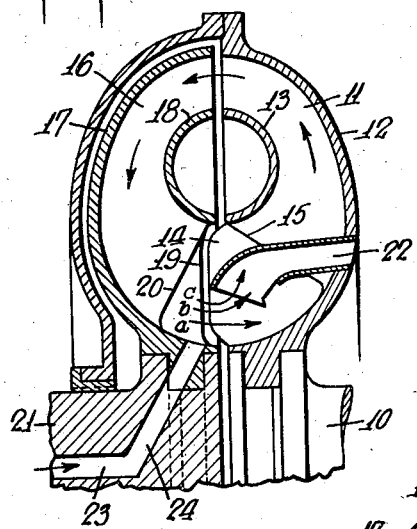
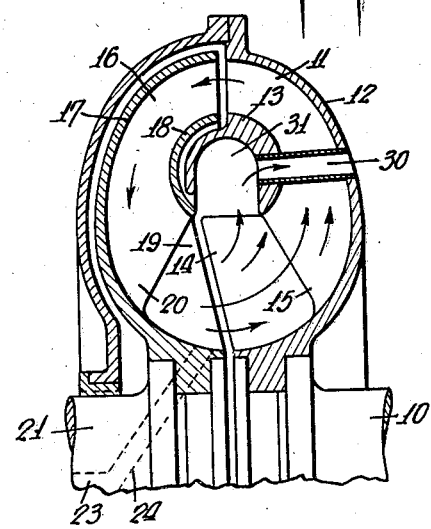
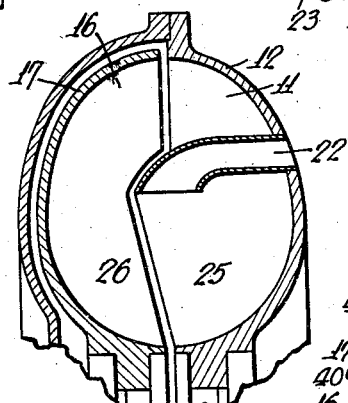
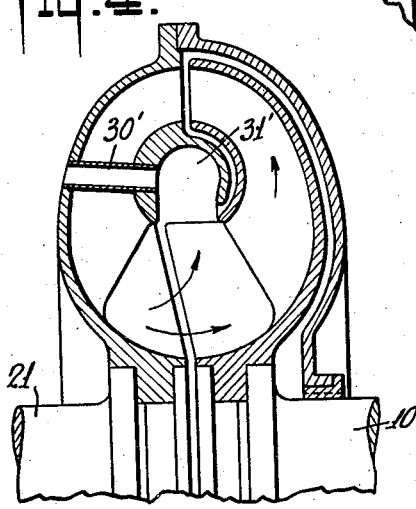
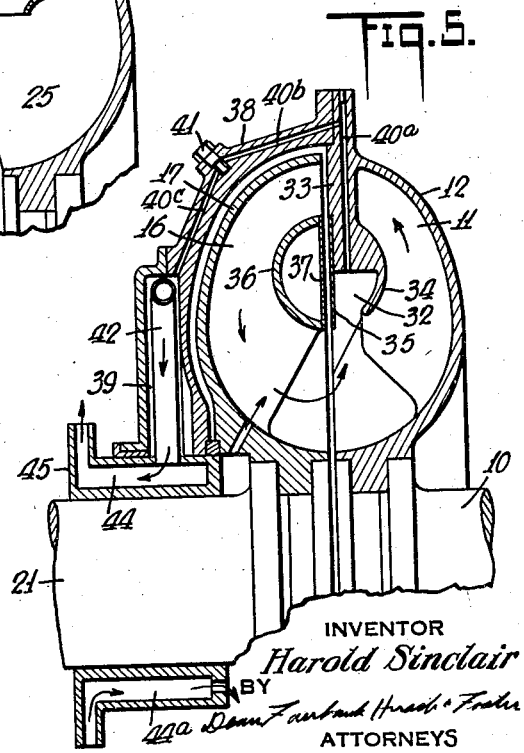

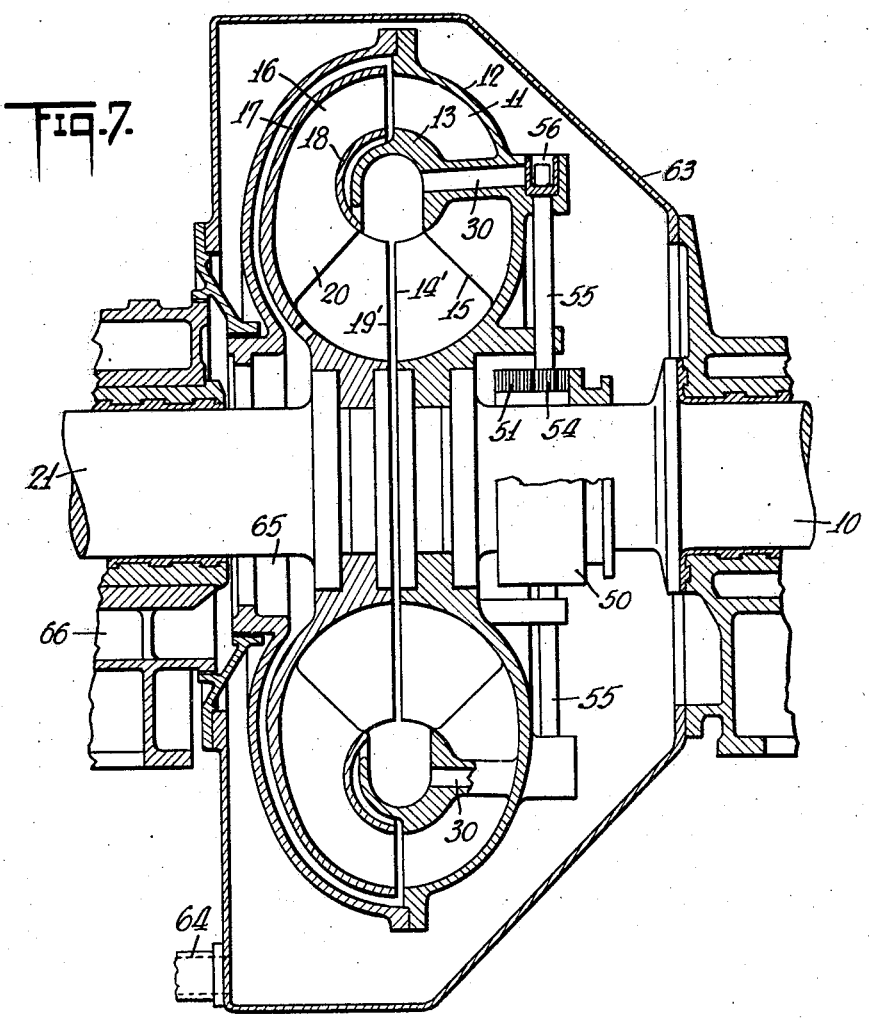
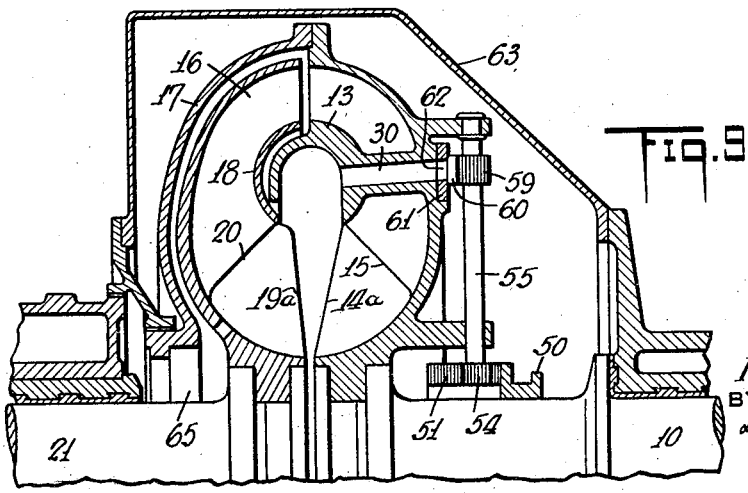

Patented Nov. 28, 1933

1,937,364

UNITED STATES PATENT OFFICE 1,937,364

HYDRAULIC COUPLING

Harold Sinclair, Surbiton, Surrey, England

Application January 8, 1931, Serial No. 507,355, and in Germany November 26, 1930

25 Claims. (Cl. 60—54)

The invention relates to hydraulic couplings of the kinetic type in which coaxial driving and driven members are so positioned that the kinetic energy of a liquid delivered by the driving member is utilized for rotating the driven member and the liquid is circulated in a vortex ring. One such construction is shown and broadly claimed in the Föttinger U. S. Patent 1,199,359, of Sept. 26, 1916.

In one type of construction it is the present customary practice to exhaust the liquid from the working circuit of a hydraulic coupling through openings at or in the vicinity of the maximum diameter thereof, the liquid being ejected under the influence of centrifugal force. Valve arrangements are frequently provided for controlling the flow of liquid through these openings. It is also known practice to maintain the exhaust openings permanently open in communication with an evacuation chamber in which is housed a stationary scoop tube to remove the liquid and eject it to a gravity or pressure supply tank. All these constructions, however, involve a certain augmentation of the external diameter of the coupling or of its enclosing casing, and consequently of the weight and cost of manufacture. Furthermore, the high centrifugal pressures have to be taken into consideration in the construction of the outlet controlling devices and their operation, and necessitates careful design and workmanship to reduce the leakage through the exhaust valves to a reasonable amount.

Owing to the comparatively great size and weight, the inertia of the exhaust controlling devices becomes high also, and special allowance has to be made for this in the construction of couplings driven by Diesel engines, because under certain circumstances these engines are apt to produce violent torsional oscillations, especially when passing through the critical speed range.

In the case of the scoop tube type of coupling the placing of the exhaust ports near the periphery necessitates a large external working casing, and a large bent scoop tube. Furthermore, in couplings of this type, particularly when the rate of flow of liquid through the coupling is large (for example when rapid speed regulating is essential), an undesirable loss of power arises, because the liquid issues under high pressure and at a high velocity from the peripheral openings.

One object of the present invention is to provide means for collecting liquid in an interior portion of the operating circuit of a hydraulic coupling at a point of less diameter than the outside periphery, and for withdrawing said collected liquid to the outside of said circuit.

Another object of the present invention is to provide means for exhausting liquid from the operating circuit of a hydraulic coupling at a low pressure and velocity, whereby the energy loss incident to the discharge of the liquid is correspondingly low.

Still another object of the present invention is to provide means for withdrawing the liquid of the operating circuit from a point in said circuit of less diameter than the periphery, whereby control means associated with said means are subjected to reduced centrifugal pressures and stresses, and the size of coupling reduced.

It is generally considered that the main body of liquid in a hydraulic coupling circulates during the transmission of power in a closed ring, and that if the circuit chamber of the coupling be partially emptied, the circulation persists in the form of a thin vortex ring, which lies closely against outer walls of the parts of the coupling. I have discovered that the circulating liquid has a marked radial component at the point where it enters the driving member which serves to direct part of the flow of liquid towards the center of the circuit, this change taking place in an increasing degree as the working circuit empties. Hence it will be seen that this current of liquid will continue to fill a receiving chamber disposed in the radial path of the liquid, as long as a circulating amount persists, and that by exhausting the liquid from the receiving chamber the coupling can be emptied at a point of much less diameter than is possible in couplings heretofore known.

In a specific embodiment of the invention, there is provided in the interior of the operating circuit a receiving chamber which is adapted to collect liquid therein while the coupling is operating, and which has a connection to the outside of the operating circuit. In one specific form, this chamber takes the form of a mouthpiece disposed to receive circulating liquid therein, and having a connection to the outside of the circuit. This mouthpiece may be disposed in the portion of the operating circuit nearest the center of rotation of the coupling, or in certain cases may be adjacent to the center of the operating circuit.

In another form, the interior of the core ring of the operating circuit may constitute the receiving chamber, said core ring being so shaped as to collect liquid therein when the coupling is operating. By means of this arrangement, the external diameter of the coupling is reduced, and the liquid is withdrawn at a lower pressure and velocity with the resulting reduction in energy loss.

My invention has a further advantage in cases where the control means are associated with the exhaust duct, this construction permitting these control devices to be made smaller and lighter, the centrifugal stresses therein being correspondingly reduced. This arrangement effects a simplified and less expensive construction, and facilitates the setting of the coupling in the limited space that is often available, particularly in ships.

The exhaust ducts for carrying off the liquid and the chamber for receiving it in the core rings can be arranged in the driven as well as in the driving half of the coupling. These exhaust ducts are advantageously arranged at an incline to the axis and in such a way that the outlet end thereof is located at a greater distance from the center of rotation than the inlet in the interior of the coupling. The control may be effected in the well known way by valves, or the like. Scoop ended exhaust tubes may also be provided to assist in picking up and carrying away the working liquid.

For the purpose of efficiently guiding the working liquid, certain of the ribs or vanes of the driving portion may be prolonged and extended over the side of the receiving chamber which is open towards the axis of rotation, while the ribs of the driven portion are correspondingly shortened. In some cases the free space between the ribs of the driving and those of the driven part may increase from the center of the shaft outwards towards the receiving chamber. The working liquid used can then be supplied in all constructions in the well known manner from the center or approximately the center of the coupling.

In the accompanying drawings, there is shown for purposes of illustration, various forms of devices embodying the present invention, in which Fig. 1 is a section through a coupling in which the exhaust ducts are arranged in the portion of the circuit chamber nearest the center of rotation.

Fig. 2 is a section through a coupling which is emptied from approximately the center of the circuit chamber, and Figs. 3 to 9 are sections of various forms of couplings in which the exhaust ducts lead from the interior of the core ring.

Like reference characters denote like parts in the several figures of the drawings.

In the specific construction shown in Fig. 1, there is provided a driving shaft 10 having connected thereto a driving member 11, constituted by an outer dished ring 12 and an inner dished ring 13, these rings being joined together by two sets of alternately disposed long and short vanes 14 and 15. The driven member 16 includes an outer dished ring 17 and an inner dished ring 18 joined together by two sets of alternately disposed long and short vanes 19 and 20, and is connected to a driven shaft 21. The dished rings 13 and 18 are juxtaposed to conjointly form a core or guide ring for the operating circuit of the fluid, the fluid in said circuit traveling in a vortex ring around the core in the direction indicated in Fig. 1.

For emptying the circuit of the coupling, there are provided one or more exhaust ducts 22 carried by the driving member. Each has an open end turned inwardly towards the center of the shaft and in the opposite direction to that of the movement of liquid in its vicinity, and located in the space between the guide rings and said shaft. The induction end of said duct 22 is advantageously made slightly flared in the shape of a mouthpiece to form a receiving chamber for collecting liquid therein. The outlet ends of said ducts are preferably disposed at a greater distance from the center of rotation of the coupling than the induction end, so as to facilitate the passage of liquid therethrough under centrifugal pressure.

During transmission of power the main body of the liquid is considered to circulate in a closed ring, which is indicated by the arrows $a$. If the working chamber of the coupling be partially emptied, the circulation in part persists in the form of a thin, vortex ring lying closely against the outer walls of the rotating parts of the coupling, but a portion leaving the driving member has been found to move in a direction having a more pronounced radial component. The liquid markedly changes its flow towards the center of the circuit said change taking place progressively as shown approximately by the arrows $a$, $b$, and $c$ as the working circuit empties.

The mouthpiece of the duct 22 is advantageously so disposed that it will intercept radial or generally radial flow of the circulating liquid. For the purpose of permitting this setting, the long vanes 14 of the driving member advantageously extend beyond the medial transverse radial plane of the circulating chamber, and the long vanes 19 of the driven member are correspondingly shaped, so that the mouthpiece end of the duct 22 may be correspondingly extended toward or into said plane. This extension of the long vanes 14 also serves as means for guiding the liquid towards the mouthpiece. In this manner, the emptying of the working circuit is assured.

For purposes of the present invention, the liquid may be charged into the circuit by any suitable means. In the form shown in Fig. 1 it is introduced through a bore 23 and then through a duct 24 into the interior of the circuit. The incoming liquid is advantageously controlled by valve means (not shown), so that with a constant rate of discharge and a variable rate of inflow, the volume of the contents and the slip may be varied at will. The duct 22 may discharge into a casing chamber surrounding the coupling in a manner similar to that shown in Fig. 6.

In Fig. 2 there is shown the adaptation of the invention to a hydraulic coupling having a coreless operating circuit, the driving and driven members being provided with vanes 25 and 26 respectively. In this case it is advantageous to dispose the duct 22' with its mouthpiece near the center of the operating circuit. The driving vanes 25 extend beyond the transverse medial plane of the operating circuit and into the region of the driven member to permit the setting of the duct 22' so that its mouthpiece is located approximately at the center of the circuit.

In Fig. 3 one or more exhaust ducts 30 are provided which are carried by the driving member, and which lead from the inside of the core to the outside of the circuit. This core is constructed so as to form an annular chamber for collecting the liquid therein during rotation of the driving member. For that purpose, the driving half of the core ring is extended towards the center of rotation of the coupling and into close proximity with the driven portion of the core ring, so as to form a chamber 31. The two portions of the core ring form a channel opening inwardly near the center of rotation of the coupling to permit the liquid to flow outward radially into the chamber 31, and the vanes 14 may be made to extend across said opening so as to serve as guides for the liquid in its radial passage.

The construction shown in Fig. 4 is similar to that of Fig. 3, except that the duct 30' is connected to the driven member, and the core ring is correspondingly changed to provide the pocket 31' in the driven portion of the core ring.

In the construction shown in Fig. 5 the exhaust channels extend radially from a receiving chamber or pocket 32 formed in the driving portion of the core ring. This driving portion of the core is advantageously made integral with the dished ring 12, being connected thereto by radial arms 33. The core ring portion has a curved flange 34 which cooperates with an annular plate 35 to form said pocket 32. The internal area of the driven portion 36 of the core ring is closed by a disc ring 37, so that the by-passing of the liquid therein is prevented.

The driving member has a casing part 38 enclosing the driven member and in the casing part is formed a separate exhaust chamber 39 connected to the chamber 32 by a series of bores 40a, 40b and 40c formed in the arms 33 and the casing 38. The periphery of the chamber 39 is of larger diameter than the inner edges of the flange 34 and the plate 35 forming the sides of the chamber 32, whereby centrifugal force tends to transfer liquid from the coupling to the exhaust chamber. The drilling of the bores 40b and 40c leaves an open end which is closed by a plug 41. The flow of liquid through these bores may be controlled by using the plug 41 as a valve.

The chamber 39 is constructed and mounted to rotate with the driving member. For discharging liquid from this chamber 39, there is provided therein one or more stationary scoop tubes 42, the open outer end thereof being advantageously disposed at substantially the same distance from the center of rotation of the coupling as the collecting chamber 32. The liquid from the scoop tube 42 is discharged into a passageway 44 in a collar or sleeve 45 encircling the driven shaft, and may pass out into a suitable receiver according to the setting of the control means (not shown). The same collar or sleeve 45 may have a separate passageway 44a connected to the interior of the coupling for returning liquid to the coupling.

The arrangements shown in Figs. 6, 7, 8 and 9 correspond in principle to that shown in Fig. 3, except that the outlet openings of the exhaust ducts 30 in these figures are controlled by valve means. Casings and other details are shown which would preferably be used in the forms shown in Figs. 1 to 4 inclusive.

In the specific construction shown in Figs. 6, 7 and 9, the control of the movement of these valve means is effected by means of a sleeve 50 mounted for slidable movement along the driving shaft 10, and having longitudinal slots provided with rack teeth 51. Meshing with these rack teeth 51 are gears 54 each mounted at the inner end of a suitably journaled rod 55, the other end of which is connected to a valve mechanism for controlling the outlet of the exhaust duct 30. In Figs. 6 and 7, the valve is shown as an open ended turning plug or sleeve valve 56 connected to the end of the rod 55, and having an opening cooperating with the outlet of the exhaust duct 30. In Fig. 9, the rod 55 has connected thereto a second gear 59 which meshes with a rack bar 60 mounted on a ring plate valve 61. This ring valve 61 has openings 62 which cooperate with the outlets of the exhaust ducts 30 for controlling the flow of liquid therefrom and is moved circumferentially by the rotation of the rods 55.

In the construction shown in Figs. 6, 7 and 9, the coupling is enclosed in a stationary casing 63 having an outlet conduit 64 leading to a reservoir. The liquid is introduced into the coupling through an annular passageway 65 connected to a supply passage 66 in the shaft bearing. The outflow of the operating circuit is controlled in response to the axial movement of the sleeve 50. This sleeve may be shifted by any suitable means.

In Fig. 6 the construction of the vanes 14 and 19 is similar to the construction shown in Fig. 3. In Fig. 7 the long vanes 14' and 19' extend to the medial plane of the operating circuit, and the distance between the short vanes 15 and 20 decreases from the inner diameter of the operating circuit to the core ring. In Figs. 8 and 9 the free space between the long vanes 14a and 19a is increased in width from the center of the shaft towards the core ring.

In the construction shown in Fig. 8, the exhaust duct 30a extends beyond the operating circuit of the coupling to form a valve seat upon which axially slides a ring valve member 68 connected to a rod 70 which is guided for axial movement in bearings formed in the casing 73, and which is controlled by any suitable means.

Having thus described my invention, what I claim as new and desire to secure by Letters Patent is:

1. Hydraulic coupling of the Föttinger type, including a driving member, a driven member, said members including core rings which are juxtaposed to form a core around which the operating liquid may circulate and which comprise an annular channel opening inward radially so as to collect working liquid while the coupling is operating and an exhaust conduit leading from said channel to the outside of said coupling.

2. A hydraulic coupling of the Föttinger type including a driving member, a driven member, a core ring around which the operating liquid may circulate, and shaped to provide an annular channel opening in such a direction as to face the direction of motion of the circulating liquid so that it can collect liquid while said coupling is operating and a conduit for exhausting said liquid leading from said channel to the outside of said coupling.

3. A hydraulic coupling of the Föttinger type including a driving member, a driven member, said members defining the working chamber, a core ring in said chamber, around which the operating liquid may circulate, carried by the driving member, and shaped to provide an annular channel opening radially inward for collecting liquid therein while said ring is rotating and a conduit for exhausting said liquid leading from said channel to the outside of said working chamber.

4. A hydraulic coupling of the Föttinger type, including a driving member, a driven member, said members defining a working chamber, a chamber for collecting liquid in the interior portion of the working chamber while said coupling is operating, an exhaust chamber rotatably connected with one of said members, a conduit between said collecting chamber and said exhaust chamber, and a stationary scoop tube disposed in said exhaust chamber and having an open end thereof facing the direction of rotation of said exhaust chamber.

5. A hydraulic coupling of the Föttinger type, including a rotatable driving member, a rotatable driven member, said members defining a working chamber and including a pair of annular rings juxtaposed to form a core within said chamber, one of said rings being shaped to form an annular liquid collecting chamber having an opening facing the axis of rotation of the coupling, an exhaust chamber connected for rotation with one of said members, a conduit connecting said collecting chamber and said exhaust chamber, and an outlet conduit connected to said exhaust chamber.

6. A hydraulic coupling including a pair of oppositely disposed rotatable dished casings, each of said casings having mounted thereon a series of vanes, said casing and vanes being juxtaposed to form an operating chamber for the circulation of the impelling fluid, an annular liquid chamber in the interior of said first mentioned chamber and adapted to receive liquid therein while said coupling is operating, the space between the vanes increasing from the center of the shaft towards said annular chamber, and an exhaust conduit extending from said second mentioned chamber to the outside of said first mentioned chamber.

7. A hydraulic coupling of the kinetic type, comprising a rotatable driving element and a rotatable driven element, said elements being juxtaposed to form an annular working chamber for the circulating liquid, and a conduit for exhausting said liquid, said conduit being mounted for rotation with one of said elements and projuxtaposed to form an annular working chamber the mouth of said conduit being so disposed that the velocity of said circulating liquid adjacent to said mouth has a component normal to the open side thereof and is low relative to the mean circulation velocity of said liquid.

8. A hydraulic coupling of the kinetic type, including coaxial rotatable driving and driven members each having vanes, said members defining an annular working chamber disposed around the axis of rotation of said members, an annular channel shaped receiving and collecting chamber coaxial with said members, disposed within said working chamber, and around which the liquid circulates in said working chamber upon the rotation of said members, said receiving and collecting chamber having an open side facing inwardly radially toward the axis of said members, and a duct extending from said receiving and collecting chamber to the exterior of said working chamber, the outer end of said duct being at a greater distance from the axis of said coupling than is the open side of said receiving and collecting chamber, whereby the energy of circulation of the liquid between said driving and driven members causes it to enter said receiving and collecting chamber, and whereby centrifugal force ejects said liquid through said duct.

9. A hydraulic coupling of the kinetic type, including coaxial rotatable driving and driven members each having vanes, said members defining an annular working chamber disposed around the axis of rotation of said members, an annular receiving and collecting chamber coaxial with said members, disposed within said working chamber, and around which the liquid circulates as a vortex ring in said working chamber upon rotation of said members, said receiving and collecting chamber having an opening facing toward the axis of said members, and a duct extending from said receiving and collecting chamber to the exterior of said working chamber, whereby the energy of circulation of the liquid between said driving and driven members causes it to enter said receiving and collecting chamber, and centrifugal force due to the rotation of said collected liquid about said axis causes said liquid to be ejected through said duct.

10. A hydraulic coupling including coaxial rotatable driving and driven members defining an annular working chamber disposed around the axis of rotation of said members for the circulation of the liquid as a vortex ring, an annular chamber coaxial with said members, disposed within said working chamber, and around which the liquid circulates in said working chamber, said receiving and collecting chamber having an opening facing toward the axis of said members and communicating with said working chamber, and a duct extending from said annular chamber to the exterior of said working chamber, the outer end of said duct being at a greater distance from the axis of said chambers than is said opening of said annular chamber, whereby centrifugal force ejects said liquid through said duct.

11. A hydraulic coupling of the kinetic type, including coaxial independently rotatable driving and driven members defining an annular working chamber disposed around the axis of rotation of said members, and means for withdrawing liquid from said chamber while said coupling is operating so as to effect substantial reduction of the liquid contents of said chamber, said means including an annular receiving and collecting chamber coaxial with and secured to one of said members, disposed within said working chamber, and around which the liquid circulates in said working chamber, said annular chamber having an opening facing in a direction substantially opposite to the direction of flow of the liquid adjacent to said opening, whereby the energy of circulation of the liquid between said driving and driven members causes it to enter said receiving and collecting chamber, said annular chamber having an outlet leading to the exterior of said chamber.

12. A hydraulic coupling of the kinetic type, having a rotatable vaned driving member, a rotatable vaned driven member, said members being coaxial and defining an annular working chamber disposed around the axis of rotation of said members, a duct mounted for rotation with one of said members, extending into said working chamber and having an inlet opening within said chamber and facing in a direction substantially opposite to the direction of flow of said liquid while circulating through said members between the vanes thereof and adjacent to said opening, whereby liquid is forced into said duct by its energy of circulation between the driving and driven members, said duct terminating outside of said working chamber at a point farther from the axis of said coupling than is said inlet opening, whereby liquid is expelled from said duct by centrifugal force during the rotation of said members about their axis, and means for controlling the flow through said duct, whereby said working chamber may be emptied of working liquid at will while said coupling is operating.

13. A hydraulic coupling of the kinetic type having a rotatable vaned driving member, a rotatable vaned driven member, said members being coaxial and defining an annular working chamber disposed around the axis of rotation of said members, a duct mounted for rotation with one of said members extending into said working chamber and having an inlet opening within said chamber and facing in a direction opposite to the direction of flow of said liquid while circulating through said members between the vanes thereof whereby liquid is forced into said duct by its energy of circulation between the driving and driven members, said duct terminating outside of said working chamber, and means for controlling the flow through said duct, whereby said working chamber may be emptied of working liquid at will while said coupling is operating.

14. A hydraulic coupling of the kinetic type having a rotatable vaned driving member, a rotatable vaned driven member, said members being coaxial and defining an annular working chamber disposed around the axis of rotation of said members, a duct carried by the driving member extending into said working chamber, extending outside of said chamber, and having an inlet opening within said chamber facing inwardly radially toward the axis of said members, whereby liquid is forced into said duct by its energy of circulation between the driving and driven members and means for controlling the flow through said duct, whereby liquid may be expelled from said chamber through said duct to empty said working chamber at will while said coupling is operating.

15. A hydraulic coupling of the kinetic type, having a driving member, a driven member, said members being independently rotatable, coaxial and defining an annular working chamber, and a duct carried by one of said members, extending into said working chamber from outside of said chamber, and having an inlet opening within said chamber facing substantially in the opposite direction to the direction of flow of said liquid adjacent to said opening while circulating through said members, whereby liquid is forced from said chamber into said duct by its energy of circulation between the driving and driven members.

16. A hydraulic coupling of the kinetic type, including coaxial rotatable driving and driven members each having vanes, said members defining an annular working circuit chamber disposed around the axis of rotation of said members, a mouthpiece disposed in the interior of said annular working circuit and adjacent to its radial medial plane transverse to said axis, and opening toward said axis, and a duct leading from said mouthpiece to the exterior of said working chamber and arranged to discharge liquid at a point at a greater distance from said axis than is said mouthpiece, whereby said circuit may be substantially emptied of working liquid while the coupling is operating.

17. A hydraulic coupling of the kinetic type, including coaxial rotatable driving and driven members each having vanes, said members defining an annular working circuit chamber disposed around the axis of rotation of said members, a mouthpiece carried by said driving member, and disposed in the interior of said annular working circuit and opening toward said axis, a duct leading from said mouthpiece to the exterior of said working chamber and arranged to discharge liquid at a point at a greater distance from said axis than is said mouthpiece, and valve mechanism controlling said duct, whereby said circuit may be substantially emptied of working liquid at will while the coupling is operating.

18. A hydraulic coupling of the kinetic type, including coaxial rotatable driving and driven members each having vanes, said members defining an annular working chamber disposed around the axis of rotation of said members, a mouthpiece disposed in the interior of said annular working circuit and adjacent to its radial medial plane transverse to said axis, and opening toward said axis, and a duct leading from said mouthpiece to the exterior of said working chamber, the vanes of one of said members projecting across said plane adjacent to the opening of said mouthpiece.

19. A hydraulic coupling of the kinetic type, including coaxial rotatable driving and driven members each having vanes, said members defining an annular working chamber, a mouthpiece disposed in the interior of said annular working chamber, and opening toward said axis, and a duct leading from said mouthpiece to the exterior of said working chamber, said mouthpiece being carried by one of said members, and the vanes of the other member projecting in an axial direction past at least a part of the opening of said mouthpiece at the radially inner side of the latter.

20. A hydraulic coupling comprising a pair of oppositely disposed coaxial, rotatable, vaned, dished shells, juxtaposed to form an annular working chamber for the circulation of the coupling liquid in a vortex ring, disposed around the axis of said coupling, and a conduit for exhausting said liquid from said chamber, said conduit having one end within said chamber and opening inwardly toward the axis of the coupling, and facing in a direction opposite to that of the flow of the liquid in the vicinity of said end, and at a shorter distance from the axis of rotation than the outer end of said conduit, whereby said liquid is forced through said conduit from said chamber by its energy of circulation between said driving and driven members.

21. A hydraulic coupling comprising a pair of oppositely disposed coaxial, rotatable, vaned, dished shells, juxtaposed to form an annular working chamber for the circulation of the coupling liquid in a vortex ring, disposed around the axis of said coupling, and a conduit for exhausting said liquid from said chamber, said conduit having one end within said chamber and having an inlet opening facing toward the axis of the coupling, and in a direction opposite to that of the flow of the liquid in the vicinity of said end, said opening being disposed nearer to the radially inner side of said chamber than to the radially outer side thereof and at a shorter distance from the axis of rotation than the outer end of said conduit, whereby said liquid tends to flow out of said chamber through said conduit during the operation of said coupling.

22. A hydraulic coupling comprising a pair of oppositely disposed coaxial, rotatable, vaned, dished shells, juxtaposed to form an annular working chamber for the circulation of the coupling liquid in a vortex ring, and a valved conduit for exhausting said liquid from said chamber, said conduit having an inlet opening at one end within said chamber and facing in a direction opposite to that of the flow of the liquid in the vicinity of said opening, and said conduit having a discharge outlet outside of said chamber at a greater distance from the axis of rotation than said inlet, whereby said liquid is forced through said conduit from said chamber by its energy of circulation between said driving and driven members.

23. A hydraulic coupling of the Föttinger type, including a driving member, a driven member, a core ring enclosed by the liquid circuit and comprising a channel opening towards the coupling axis, and a duct leading from said core ring to the outside of said circuit.

24. A hydraulic coupling including a driving member, a driven member, said members having annular series of vanes propelling and propelled by a working liquid, a core ring in the liquid circuit, the driving portion of said core ring furthest from the center being curved inwardly toward the center to form an annular chamber, and a duct leading from said chamber to the outside of said circuit.

25. A hydraulic coupling including a rotatable driving member, a rotatable driven member, said members conjointly defining a fluid working circuit, a core ring in said circuit and connected to the driving member, said core ring being provided with a channel opening towards the coupling axis for collecting liquid therein during the rotation of said driving member, and a duct leading from said channel to the outside of said circuit.

HAROLD SINCLAIR.